(12) United States Patent
Xiao

(10) Patent No.: US 9,431,047 B1
(45) Date of Patent: Aug. 30, 2016

(54) METHOD FOR PROVIDING AN IMPROVED AFM READER SHIELD

(71) Applicant: Western Digital (Fremont), LLC, Fremont, CA (US)

(72) Inventor: Rongfu Xiao, Dublin, CA (US)

(73) Assignee: WESTERN DIGITAL (FREMONT), LLC, Fremont, CA (US)

( * ) Notice: Subject to any disclaimer, the term of this patent is extended or adjusted under 35 U.S.C. 154(b) by 581 days.

(21) Appl. No.: 13/927,007

(22) Filed: Jun. 25, 2013

Related U.S. Application Data

(60) Provisional application No. 61/818,389, filed on May 1, 2013.

(51) Int. Cl.
*G11B 5/852* (2006.01)

(52) U.S. Cl.
CPC .................... *G11B 5/852* (2013.01)

(58) Field of Classification Search
CPC .......... G11B 5/852; G11B 5/11; G11B 5/112
See application file for complete search history.

(56) References Cited

U.S. PATENT DOCUMENTS

| | | |
|---|---|---|
| 5,583,725 A | 12/1996 | Coffey et al. |
| 5,804,250 A | 9/1998 | Yang |
| 5,838,521 A | 11/1998 | Ravipati |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,491 A | 3/2000 | Lin |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |

(Continued)

FOREIGN PATENT DOCUMENTS

JP 2002298314 A 11/2002

OTHER PUBLICATIONS

Rongfu Xiao, et al., U.S. Appl. No. 13/607,624, filed Sep. 7, 2012, 28 pages.

(Continued)

*Primary Examiner* — Shamim Ahmed
*Assistant Examiner* — Bradford Gates
(74) *Attorney, Agent, or Firm* — Convergent Law Group LLP

(57) ABSTRACT

A method provides a magnetic transducer including a first shield, a read sensor, and a second shield. The read sensor is between the first shield and the second shield. The read sensor has at least one pinned layer aligned with a sensor pinning direction. Providing the second shield includes depositing at least one of a first ferromagnetic layer, a second ferromagnetic and a pinning layer in the presence of a first magnetic field in a first direction non-orthogonal and non-parallel to the sensor pinning direction. A nonmagnetic spacer layer is between the first ferromagnetic layer and the second ferromagnetic layer. The pinning layer is adjacent to the second ferromagnetic layer. The first ferromagnetic layer is between the read sensor and the nonmagnetic spacer layer. The first ferromagnetic layer is coupled antiparallel with the second ferromagnetic layer.

21 Claims, 5 Drawing Sheets

(56) References Cited

U.S. PATENT DOCUMENTS

| | | |
|---|---|---|
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,129,957 A | 10/2000 | Xiao et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,315,839 B1 | 11/2001 | Pinarbasi et al. |
| 6,317,290 B1 | 11/2001 | Wang et al. |
| 6,317,297 B1 | 11/2001 | Tong et al. |
| 6,322,640 B1 | 11/2001 | Xiao et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,358,635 B1 | 3/2002 | Min et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,388,847 B1 | 5/2002 | Horng et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,413,325 B1 | 7/2002 | Shimazawa et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,015 B2 | 8/2002 | Ju et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,437,949 B1 | 8/2002 | Macken et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,385 B1 | 9/2002 | Shimazawa et al. |
| 6,452,742 B1 | 9/2002 | Crue et al. |
| 6,452,765 B1 | 9/2002 | Mahvan et al. |
| 6,456,465 B1 | 9/2002 | Louis et al. |
| 6,456,467 B1 | 9/2002 | Mao et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,478,884 B2 | 11/2002 | Shimazawa et al. |
| 6,479,096 B1 | 11/2002 | Shi et al. |
| 6,482,657 B2 | 11/2002 | Shimazawa |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,496,335 B2 | 12/2002 | Gill |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,556,392 B1 | 4/2003 | Mao et al. |
| 6,577,470 B1 | 6/2003 | Rumpler |

(56) References Cited

U.S. PATENT DOCUMENTS

| | | |
|---|---|---|
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,393 B1 | 10/2003 | Araki et al. |
| 6,636,394 B1 | 10/2003 | Fukagawa et al. |
| 6,636,396 B1 | 10/2003 | Gill |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,700,760 B1 | 3/2004 | Mao |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,724,581 B2 | 4/2004 | Westwood |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,048 B2 | 6/2004 | Li et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,409 B2 | 10/2004 | Michel et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,848,169 B2 | 2/2005 | Shin et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,876,507 B2 | 4/2005 | Chen et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,980,403 B2 | 12/2005 | Hasegawa |
| 6,987,643 B1 | 1/2006 | Seagle |
| 6,989,962 B1 | 1/2006 | Dong et al. |
| 6,989,972 B1 | 1/2006 | Stoev et al. |
| 6,998,061 B1 | 2/2006 | Cross |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,029,771 B2 | 4/2006 | Hasegawa et al. |
| 7,035,046 B1 | 4/2006 | Young et al. |
| 7,041,985 B1 | 5/2006 | Wang et al. |
| 7,046,487 B2 | 5/2006 | Terunuma |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,150,093 B2 | 12/2006 | Beach |
| 7,154,715 B2 | 12/2006 | Yamanaka et al. |
| 7,158,351 B2 | 1/2007 | Nakamoto et al. |
| 7,166,173 B2 | 1/2007 | Beach |
| 7,170,725 B1 | 1/2007 | Zhou et al. |
| 7,177,117 B1 | 2/2007 | Jiang et al. |
| 7,180,712 B1 | 2/2007 | Li et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,270,896 B2 | 9/2007 | Parkin |
| 7,280,325 B1 | 10/2007 | Pan |

(56) References Cited

U.S. PATENT DOCUMENTS

| | | |
|---|---|---|
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,295,401 B2 | 11/2007 | Jayasekara et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,751 B2 | 3/2008 | Nagasaka et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,443,639 B2 | 10/2008 | Parkin |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,599,154 B2 | 10/2009 | Sbiaa et al. |
| 7,606,007 B2 | 10/2009 | Gill |
| 7,606,010 B2 | 10/2009 | Parkin |
| 7,639,457 B1 | 12/2009 | Chen et al. |
| 7,652,854 B2 | 1/2010 | Kagami et al. |
| 7,660,080 B1 | 2/2010 | Liu et al. |
| 7,666,467 B2 | 2/2010 | Parkin |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,807,218 B2 | 10/2010 | Parkin |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,859,797 B2 | 12/2010 | Hoshino et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,906,231 B2 | 3/2011 | Parkin |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,097 B2 | 8/2011 | Parkin |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,049,997 B2 | 11/2011 | Miyauchi et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,089,734 B2 | 1/2012 | Miyauchi et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,743 B2 | 2/2012 | Ohta et al. |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |

(56) References Cited

U.S. PATENT DOCUMENTS

| | | |
|---|---|---|
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,451,567 B2 | 5/2013 | Zhou et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,147 B2 | 6/2013 | Singleton et al. |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |

(56) References Cited

U.S. PATENT DOCUMENTS

| | | |
|---|---|---|
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 2004/0196681 A1 | 10/2004 | Xiao et al. |
| 2005/0011066 A1* | 1/2005 | Gill ............... B82Y 10/00 29/603.08 |
| 2005/0264948 A1 | 12/2005 | Nakamoto et al. |
| 2006/0003185 A1 | 1/2006 | Parkin |
| 2006/0109592 A1 | 5/2006 | Watanabe et al. |
| 2006/0226940 A1 | 10/2006 | Lee et al. |
| 2007/0053114 A1 | 3/2007 | Uesugi et al. |
| 2007/0111332 A1 | 5/2007 | Zhao et al. |
| 2007/0195467 A1 | 8/2007 | Gill |
| 2008/0013221 A1 | 1/2008 | Ohta et al. |
| 2008/0179699 A1 | 7/2008 | Horng et al. |
| 2009/0027810 A1 | 1/2009 | Horng et al. |
| 2009/0128944 A1 | 5/2009 | Jang et al. |
| 2009/0229111 A1 | 9/2009 | Zhao et al. |
| 2009/0279213 A1 | 11/2009 | Wu et al. |
| 2010/0079917 A1 | 4/2010 | Miyauchi et al. |
| 2010/0149689 A1 | 6/2010 | Tsuchiya et al. |
| 2010/0214692 A1 | 8/2010 | Kief et al. |
| 2010/0232074 A1* | 9/2010 | Machita ............ B82Y 10/00 360/324.11 |
| 2010/0290157 A1 | 11/2010 | Zhang et al. |
| 2010/0320076 A1 | 12/2010 | Zhao et al. |
| 2011/0086240 A1 | 4/2011 | Xiang et al. |
| 2011/0102949 A1 | 5/2011 | Yuan et al. |
| 2012/0063218 A1 | 3/2012 | Huai et al. |
| 2012/0087045 A1 | 4/2012 | Yanagisawa et al. |
| 2012/0087046 A1 | 4/2012 | Yanagisawa et al. |
| 2012/0111826 A1 | 5/2012 | Chen et al. |
| 2012/0147504 A1 | 6/2012 | Zhou et al. |
| 2012/0216378 A1 | 8/2012 | Emley et al. |
| 2012/0237878 A1 | 9/2012 | Zeng et al. |
| 2012/0250189 A1 | 10/2012 | Degawa et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |

OTHER PUBLICATIONS

Yuankai Zheng, et al., U.S. Appl. No. 13/691,729, filed Nov. 30, 2012, 15 pages.

* cited by examiner

METHOD FOR PROVIDING AN IMPROVED AFM READER SHIELD

CROSS-REFERENCE TO RELATED APPLICATIONS

This application claims priority to provisional U.S. Patent Application Ser. No. 61/818,389, filed on May 1, 2013, which is hereby incorporated by reference in its entirety.

BACKGROUND

FIG. 1 depicts an air-bearing surface (ABS) view of a conventional read transducer 10. The conventional read transducer 10 includes shields 12 and 20, sensor 14 and magnetic bias structures 16. The read sensor 14 is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures 16. These magnetic bias structures are used to magnetically bias the sensor layer of the sensor 14.

Although the conventional transducer 10 functions, there are drawbacks. In particular, the magnetic moment of the shield 20 may be unstable. For example, there may be multiple magnetic domains within the shield 20. Movement of domain walls and other changes to the magnetic moment of the shield 20 may introduce noise or otherwise adversely affect performance of the conventional read transducer 10.

Accordingly, what is needed is a system and method for improving the performance of a magnetic recording read transducer.

DETAILED DESCRIPTION OF THE PREFERRED EMBODIMENTS

Figure 1:
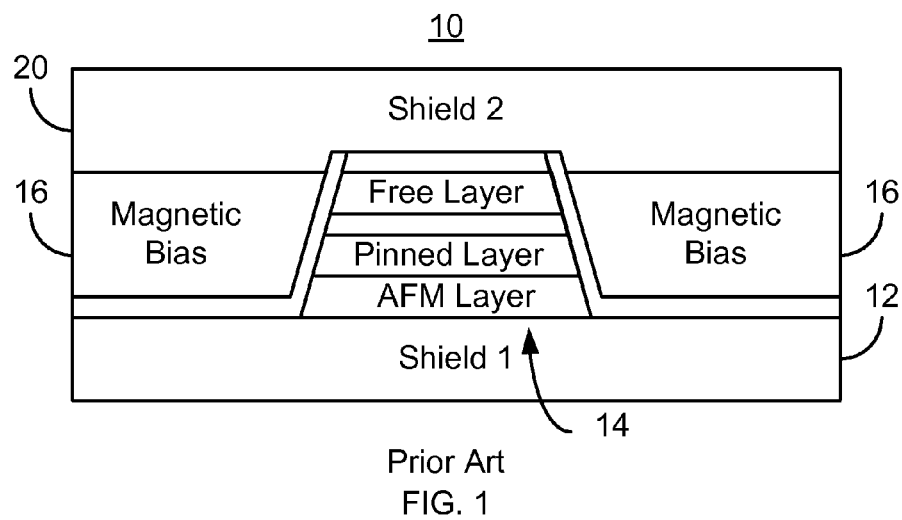
FIG. 1 depicts a conventional read transducer.
Figure 2:
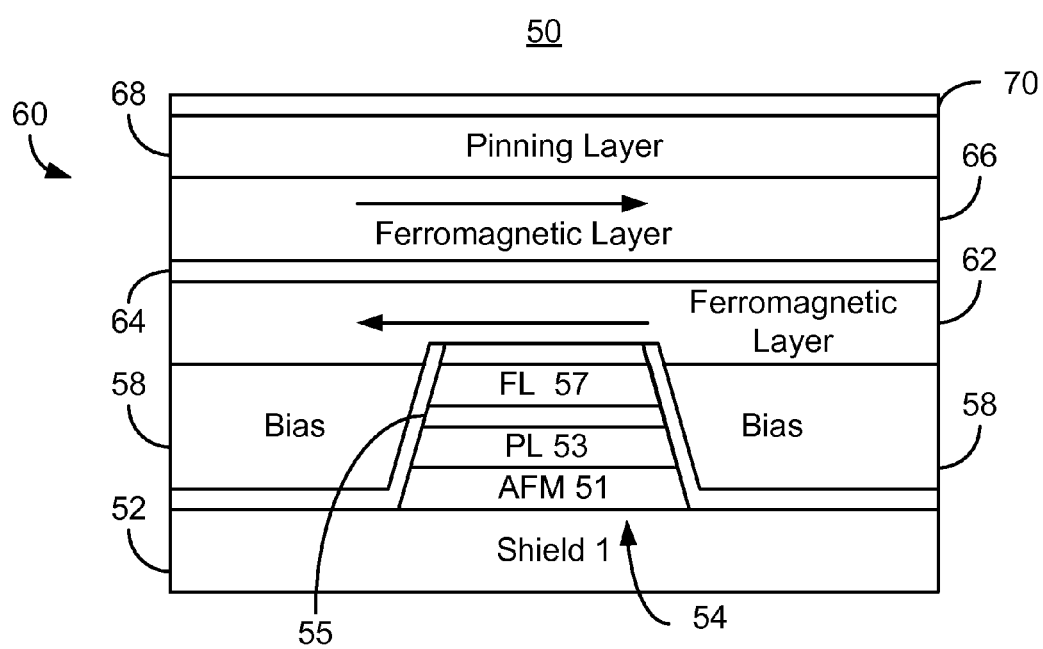
FIG. 2 depicts an ABS view of an exemplary embodiment of a magnetic recording read transducer.

FIG. 2 depicts an ABS view of a portion of an exemplary embodiment of a magnetic read transducer 50. For clarity, FIG. 2 is not to scale. The read transducer 50 may be part of a read head or may be part of a merged head that also includes a write transducer. The transducer 50 includes shields 52 and 60, a read sensor 54, and magnetic bias structures 58. The sensor 54 shown is a GMR or TMR sensor. Thus, the sensor 54 includes a sensor pinning layer 51 that may be an AFM layer, a pinned layer 53, a nonmagnetic spacer layer 55, a free layer 57, and a capping layer (not labeled in FIG. 2). The sensor 54 may also include seed layer(s) (not shown). An AFM layer 51 is used to pin the magnetic moment of the pinned layer 53 in a direction. This pinning direction may be set by annealing the sensor 54 in a magnetic field oriented in the desired, sensor pinning, direction. In other embodiments, the pinning layer 51 may be omitted or may use a different pinning mechanism. The pinned layer 53 and free layer 57 are each shown as a single layer, but may include multiple layers including but not limited to a synthetic antiferromagnetic (SAF) structure. The nonmagnetic spacer layer 55 may be a conductive layer, a tunneling barrier layer, or other analogous layer. Although depicted as a GMR or TMR sensor, in other embodiments, other structures and other sensing mechanisms may be used for the sensor.

The magnetic bias structures 58 may be soft bias structures fabricated with soft magnetic material(s). In such an embodiment, the soft magnetic bias structures 58 have a high permeability and a coercivity of less than ten Oe. In some such embodiments, the soft magnetic bias structures 58 have a coercivity of not more than five Oe. For example, the soft magnetic bias structures 58 may include NiFe, such as Permalloy. In other embodiments, the magnetic bias structures 58 may be hard magnetic bias structures. In such embodiments, the hard magnetic bias structures would have their magnetic moment set perpendicular to the sensor pinning direction. Because the soft magnetic bias structures 56 have a magnetic moment, the soft magnetic bias structures 56 magnetically bias the free layer.

The magnetic read transducer 50 also includes an antiparallel coupled second shield 60. The shield 60 includes ferromagnetic layers 62 and 66, nonmagnetic spacer layer 64, and pinning layer 68. The shield 60 may also include a capping layer 70. The ferromagnetic layers 62 and 66 are separated by nonmagnetic spacer layer 64. The nonmagnetic spacer layer 64 may be Ru, which allows the magnetic moments of the layers 62 and 66 to be coupled antiparallel. The nonmagnetic spacer layer 64 may have a thickness of at least four Angstroms and not more than ten Angstroms. If such a Ru layer is used, the ferromagnetic layers 62 and 66 may be antiferromagnetically coupled via an RKKY interaction. In other embodiments, another coupling mechanism may be used. The ferromagnetic layers 62 and 66 may each be a simple layer or a multilayer. For example, the ferromagnetic layer 62 may include a NiFe layer and CoFe layer. The ferromagnetic layer 66 may include a CoFe layer and a NiFe layer. In other embodiments the ferromagnetic layer 66 may include two CoFe layers that sandwich a NiFe layer The NiFe is a soft magnetic material. The moment of the ferromagnetic layer 66 is pinned by the pinning layer 68. The pinning layer 68 is typically an antiferromagnet (AFM), such as IrMn.

Figure 3:
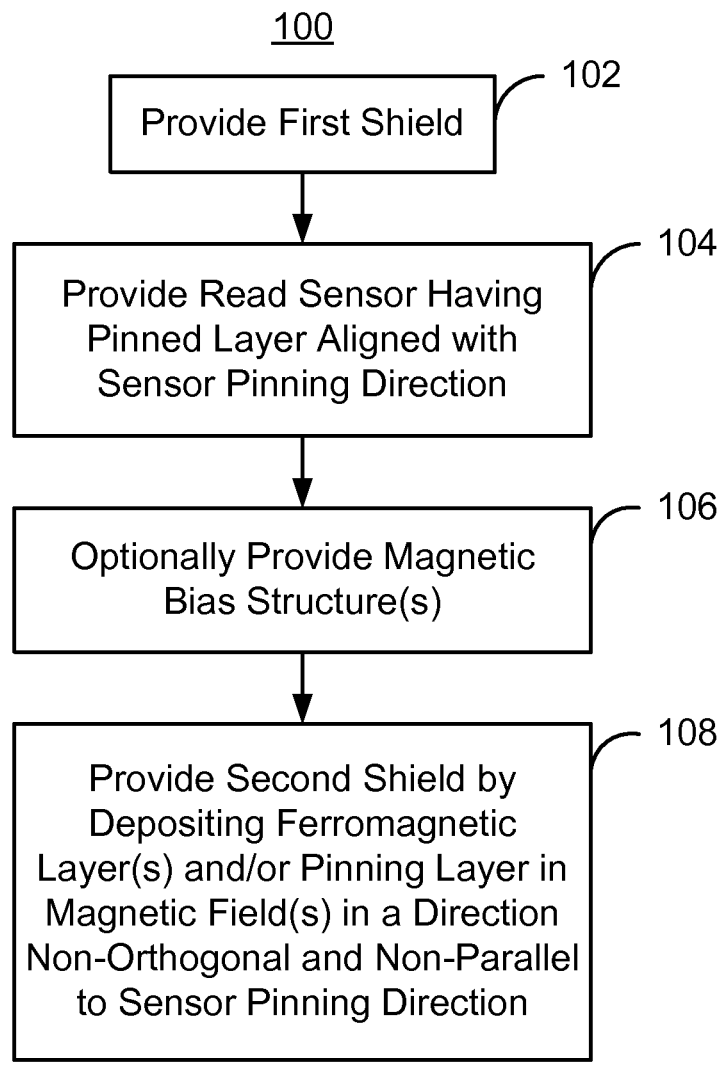
FIG. 3 is flow chart depicting an exemplary embodiment of a method for fabricating a magnetic recording read transducer.

FIG. 3 is an exemplary embodiment of a method 100 for providing a read transducer including an antiparallel coupled shield. For simplicity, some steps may be omitted, interleaved, and/or combined. The method 100 is also described in the context of providing a single recording transducer 50 and shield 60 depicted in FIG. 2. However, the method 100 may be used to fabricate multiple transducers at substantially the same time. The method 100 may also be used to fabricate other shields including but not limited to the shield 60. The method 100 is also described in the context of particular layers. A particular layer may include multiple materials and/or multiple sub-layers. The method 100 also may start after formation of other portions of the magnetic recording transducer.

Referring to FIGS. 2-3, the first shield 52 is provided, via step 102. Step 102 typically includes depositing a large high permeability layer. The sensor 54 is provided, via step 104. Step 104 typically includes depositing the layers for the sensor 54, then defining the sensor 54 in at least the track width direction using an ion mill. In some embodiments, the free layer 57 and pinned layer 53 of the sensor 54 are also defined in the stripe height direction. The direction in which the magnetic moment of the pinned layer 53 is pinned is also set in step 104. This direction is termed herein the sensor pinning direction. Step 104 may include annealing the sensor 54 in the presence of a magnetic field oriented in the direction in which the magnetic moment of the pinned layer 53.

The magnetic bias structures 58 may optionally be provided, via step 106. The magnetic bias structures 58 may be soft magnetic bias structures. Step 106 may thus include depositing the high permeability and any other material(s) for the magnetic bias structures 58 and defining the magnetic bias structures 58 in the track width and stripe height direction. In some embodiments, portions of steps 104 and 106 are interleaved. For example, portions of the sensor 54 may be defined in the stripe height direction as the soft magnetic bias structures are defined in the stripe height direction. Step 106 may also include depositing multiple layers for the soft magnetic bias structures 58. Further, in some embodiments, the soft magnetic bias structures 58 are provided such that they may be magnetically coupled to the shield 52 and/or 60. In other embodiments, step 106 may form hard bias structures. In such embodiments, the hard bias materials, which have a coercivity higher than that used in reading or writing, are deposited. In addition, a field may be applied to set the magnetization direction for the hard bias structures 58. In such embodiments, the hard bias magnetic field applied in step 106 is generally perpendicular to the sensor pinning direction of step 104. Thus, the hard bias pinning direction is also perpendicular to the sensor pinning direction.

The shield 60 is provided in step 108. In some embodiments, the substeps of step 108 are performed as a single processing block in a single deposition system. Thus, the ferromagnetic layers 62 and 66, nonmagnetic layer 64, pinning layer 68 and capping layer 70 are provided, via step 108. Step 108 includes depositing one or more of the layers 62, 66 and 68 in a magnetic field. These deposition magnetic fields may be oriented such that is it neither orthogonal to nor parallel to the sensor pinning direction. In some embodiments, all of the magnetic layers 62, 66 and 68 are deposited in field(s) oriented in the same direction. In some embodiments, the magnitude of the deposition magnetic field(s) for the layers 62 and 66 are also the same. In other words, the same deposition magnetic field may be used for each of the layers 62 and 66. Typically, the magnitude of the magnetic field for the layer 68 is lower than that used for the layers 62 and 66. In some embodiments, the deposition field is oriented at least forty-five degrees and not more than seventy degrees from the sensor pinning direction. In some such embodiments, the deposition field is at least fifty degrees and not more than sixty degrees from the sensor pinning direction. If a hard bias structure is used for magnetic bias structures 58, then the direction of the magnetic field used in step 108 may be between the sensor pinning direction and the hard bias magnetic field direction. However, in another embodiment, the deposition and/or annealing fields may be oriented in another direction.

In some embodiments, step 108 also includes annealing the second shield 60 in a magnetic field. This annealing magnetic field in step 108 may be oriented in the same direction as the deposition magnetic field for one or more of the layers 62, 66 and 68. However, the annealing magnetic field generally has a significantly larger magnitude than the deposition magnetic field. The annealing may be at a temperature of at least two hundred degrees and not more than two hundred and fifty degrees centigrade for a time of at least fifteen minutes and not more than two hours. In some embodiments, the anneal is at a temperature of at least two hundred twenty degrees and not more than two hundred thirty degrees centigrade for at least thirty minutes and not more than one hour. However, in other embodiments, other anneal times and/or temperatures may be used.

Figure 4:
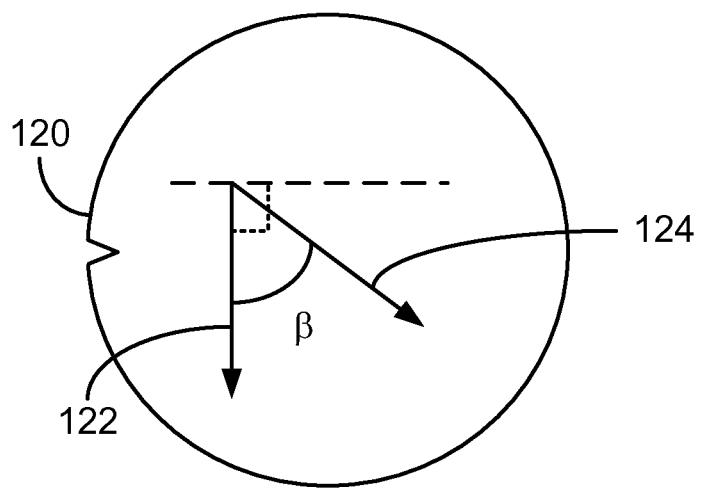
FIG. 4 depicts a plan view of an exemplary embodiment of magnetic recording transducers during fabrication.
Figure 5:
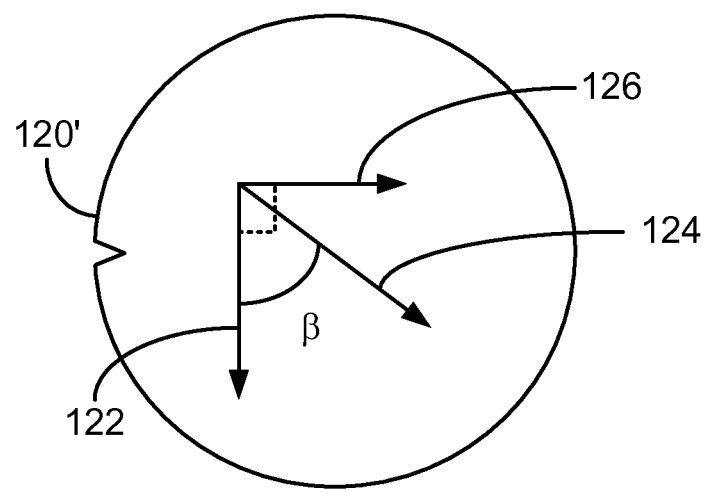
FIG. 5 depicts a plan view of another exemplary embodiment of magnetic recording transducers during fabrication.
Figure 6:
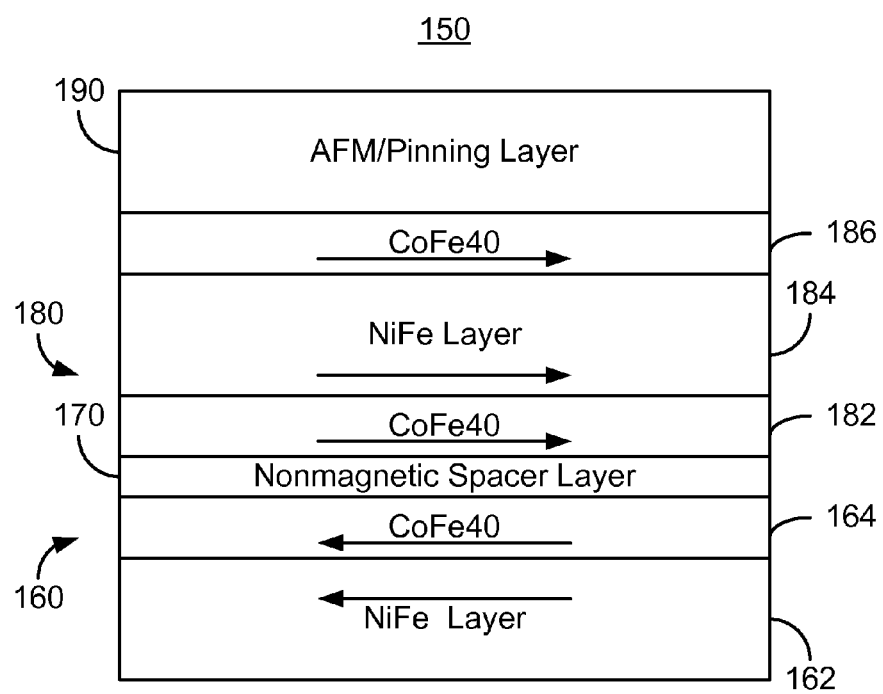
FIG. 6 depicts an ABS view of another exemplary embodiment of a portion of a shield in a magnetic recording read transducer.

The orientations of the fields and pinning directions may be understood with reference to FIGS. 4-5. For example, FIG. 4 depicts an exemplary embodiment of a substrate 120 on which one or more magnetic transducers 50 may be fabricated. For simplicity, individual transducers 50 are not shown. For clarity, FIG. 4 is not to scale. FIG. 4 depicts the relevant directions of magnetic field(s) and/or pinning directions. Referring to FIGS. 2-4, the arrow 122 depicts the sensor pinning direction. Thus, the magnetic field used in step 104 is oriented along the arrow 122. As such, the arrow 122 is also the direction in which the magnetic moment of the pinned layer 53 is oriented and is referred to hereafter as the sensor pinning direction. The sensor pinning direction 122 thus indicates the direction of the magnetic field that provides the read sensor 54 and sets the direction of magnetization of the pinned layer 53. The dashed line indicates a direction perpendicular to the sensor pinning direction 122. The arrow 124 depicts the direction at which the deposition magnetic field(s) are oriented. These fields are at an angle, β, from the sensor pinning direction 122. This angle, β, neither zero nor ninety degrees. Although β is shown as being measured clockwise from the pinning direction 122, in other embodiments, β may be counterclockwise from the pinning direction 122. Further, the arrow 124 may also indicate the direction at which the shield 60 is annealed. Thus, the deposition magnetic field(s) and the annealing magnetic field(s) may oriented along the arrow 124.

FIG. 5 depicts another exemplary embodiment of a substrate 120' on which one or more magnetic transducers 50 may be fabricated. For simplicity, individual transducers 50 are not shown. For clarity, FIG. 5 is not to scale. The components shown in FIG. 5 are analogous to those shown in FIG. 4 and are, therefore, labeled similarly. FIG. 5 depicts the relevant directions of magnetic field(s) and/or pinning directions. Referring to FIGS. 2-3 and 5, the arrow 122 depicts the sensor pinning direction, described above. The arrow 124 depicts the direction at which the deposition magnetic field(s) are oriented. These fields are at an angle, β, from the sensor pinning direction 122. This angle, β, neither zero nor ninety degrees. Although β is shown as being measured counterclockwise from the pinning direction 122, in other embodiments, β may be clockwise from the pinning direction 122. Further, the arrow 124 may also indicate the direction at which the shield 60 is annealed. Thus, the deposition magnetic field(s) and the annealing magnetic field(s) may oriented along the arrow 124.

In addition, in the embodiment shown in FIG. 5, the bias structures 58 are hard bias structures. The arrow 126 thus depicts the direction at which the magnetic moments of the hard bias structures 58 are oriented. The arrow 126 is thus termed the hard bias pinning direction 126. In the embodiment shown, the arrow 124 is between the sensor pinning direction 122 and the hard bias pinning direction 126. In other words, the deposition magnetic field(s) are oriented in a direction between the sensor pinning direction 122 and the hard bias pinning direction 126. Similarly, the annealing magnetic field for the shield 60 may be oriented in a direction between the sensor pinning direction 122 and the hard bias pinning direction 126. However, in other embodiments, the deposition magnetic field(s) and/or the annealing magnetic field(s) may be oriented in another direction.

The method 100 may result in improved performance of the magnetic transducer 50. Because the magnetic transducer 50 has an antiferromagnetically coupled second shield 60, the performance of the magnetic transducer 50 may be improved. More specifically, noise that may adversely affect the performance of a conventional magnetic transducer may be reduced or eliminated. Further, the stability of the antiferromagnetically coupled shield 60 may be enhanced. Deposition of the magnetic layers 62, 66 and/or 68 in a field as described above in conjunction with annealing the shield 60 in a field having the same direction may result in the magnetic moments of the layers 62 and 66 being more stably pinned. For example, there may be little or no change in the easy axes of the layers 62 and 66 at working temperatures of the magnetic transducer 50. The characteristics of the magnetic transducer 50 may be more stable. Thus, performance of the transducer 50 may be enhanced.

FIG. 4 is an exemplary embodiment of a portion of a shield 150. For clarity, FIG. 4 is not to scale. The shield 150 is analogous to the shield 60. However, the shield 140 includes multiple layers and/or materials rather than single monolithic layers, but may still be formed using the method 100. Referring to FIGS. 2-6, the shield 150 includes two ferromagnetic layers 160 and 180 separated by a nonmagnetic spacer layer 170. The ferromagnetic layers 160 and 180 may be magnetically soft. The ferromagnetic layers 160 and 180 are also coupled antiparallel through the nonmagnetic spacer layer 170, for example via an RKKY coupling. In some embodiments, therefore, the nonmagnetic spacer layer 170 may be Ru. The shield 150 may also include a pinning layer 190, such as an AFM layer, that pins the magnetic moment of the ferromagnetic layer 180. In some embodiments, the pinning layer 190 includes at least sixty and not more than three hundred Angstroms of IrMn. Thus, one ferromagnetic layer 160 may be adjacent to the magnetic bias structures 58 and sensor 54, while the other ferromagnetic layer 180 is adjacent to the pinning layer 190. In the embodiment shown, the ferromagnetic layer 180 is a soft magnetic layer.

The bottom ferromagnetic layer 160 includes two ferromagnetic layers 162 and 164 that are ferromagnetically coupled. In other embodiments, the ferromagnetic layer 160 may include another number of layers. Further, although depicted and described as separate layers, layers 162 and 164 may just be two portions 162 and 164 of the layer 160. For example, there may be no clear interface between the layers 162 and 164, simply change(s) in concentrations and/or types of constituents. The ferromagnetic layer 162 is a soft magnetic layer. For example, the ferromagnetic layer 162 may be a NiFe layer 162. The ferromagnetic layer 162 is also generally significantly thicker than the layer 164. In some embodiments, for example, the ferromagnetic layer 162 may be at least two hundred Angstroms thick, while the layer 164 is not more than thirty Angstroms thick. In other embodiments, the thicknesses of the layers 162 and 164 may vary.

The other ferromagnetic layer 164 is a CoFe layer. The CoFe layer 164 may include at least twenty-five atomic percent and not more than fifty atomic percent Fe. In other words, the layer 164 is $Co_{1-x}Fe_x$, where x is at least 0.25 and not more than 0.5. In some embodiments, the CoFe layer 164 includes at least thirty-five percent and not more than forty atomic percent Fe. However, other stoichiometries may be used in other embodiments. The layer 164 may also be thin. For example, the layer 164 may be not more than twenty Angstroms thick. In some embodiments, the layer 164 is not more than ten Angstroms thick. As described with respect to step 108 of the method 100, the ferromagnetic layer 160 may be deposited in a magnetic field oriented in a direction 124 at an angle, β, from the sensor pinning direction 122. Thus, the layers 162 and 164 may be deposited in the deposition magnetic field in the direction 124.

The ferromagnetic layer 180 is depicted as including layers 182, 184 and 186 that are ferromagnetically coupled. In other embodiments, the ferromagnetic layer 180 may include some combination of one or more of the layers 182, 184 and 186. In other embodiments, the ferromagnetic layer 180 may include another number of layers. The ferromagnetic layer 184 is a soft magnetic layer and may be a NiFe layer. The ferromagnetic layer 184 is also generally significantly thicker than the layer 182 or 186. In some embodiments, for example, the ferromagnetic layer 184 may be at least two hundred Angstroms thick, while the layers 182 and 186 may each be not more than thirty Angstroms thick. In some embodiments, the layers 182 and 186 may each be not more than twenty Angstroms thick. In some embodiments, the layers 182 and 186 are each not more than ten Angstroms thick. In other embodiments, the thicknesses of the layers 182, 184 and 186 may vary. The ferromagnetic layers 182 and 186 may each be a CoFe layer. The CoFe layers 182 and 186 may each includes at least twenty-five atomic percent and not more than fifty atomic percent Fe. In some embodiments, each of the CoFe layers 182 and 186 includes at least thirty-five percent and not more than forty atomic percent Fe. However, other stoichiometries are possible. As described with respect to step 108 of the method 100, the ferromagnetic layer 180 may be deposited in a magnetic field oriented in a direction 124 at an angle, β, from the sensor pinning direction 122. Thus, the layers 182, 184 and 184 may be deposited in the deposition magnetic field in the direction 124. Further, as discussed above for the method 100, the shield 150 may be annealed in a magnetic field along the direction 124.

Use of the method 100 in fabricating the shield 150 may result in the magnetic moments of the layers 162, 164, 182, 184 and 186 being more stable. Performance and stability of the magnetic shield 150, and thus the transducer 50, may be improved. Because of the presence of the CoFe layers 182 and 164, the coupling between the layers 160 and 180 may be enhanced. The saturation field, $H_{sat}$, may also be increased. In addition, peaks in the oscillations in the RKKY interaction between the layers 180 and 160 may be broadened. Thus, the antiferromagnetic coupling between the layers 160 and 180 may be less sensitive to the thickness of the layer 170. The margin for processing of the shield 150 may thus be increased. Performance of the shield 150 and, therefore, the magnetic recording transducer 50 may be enhanced. Further, the layer 180 has the CoFe layer 186 adjacent to the antiferromagnetic layer 190. In such embodiments, the exchange coupling between the ferromagnetic layer 180 and the AFM layer 190 is enhanced. Performance of the shield 150 and the magnetic recording transducer 50 may be further improved.

Figure 7:
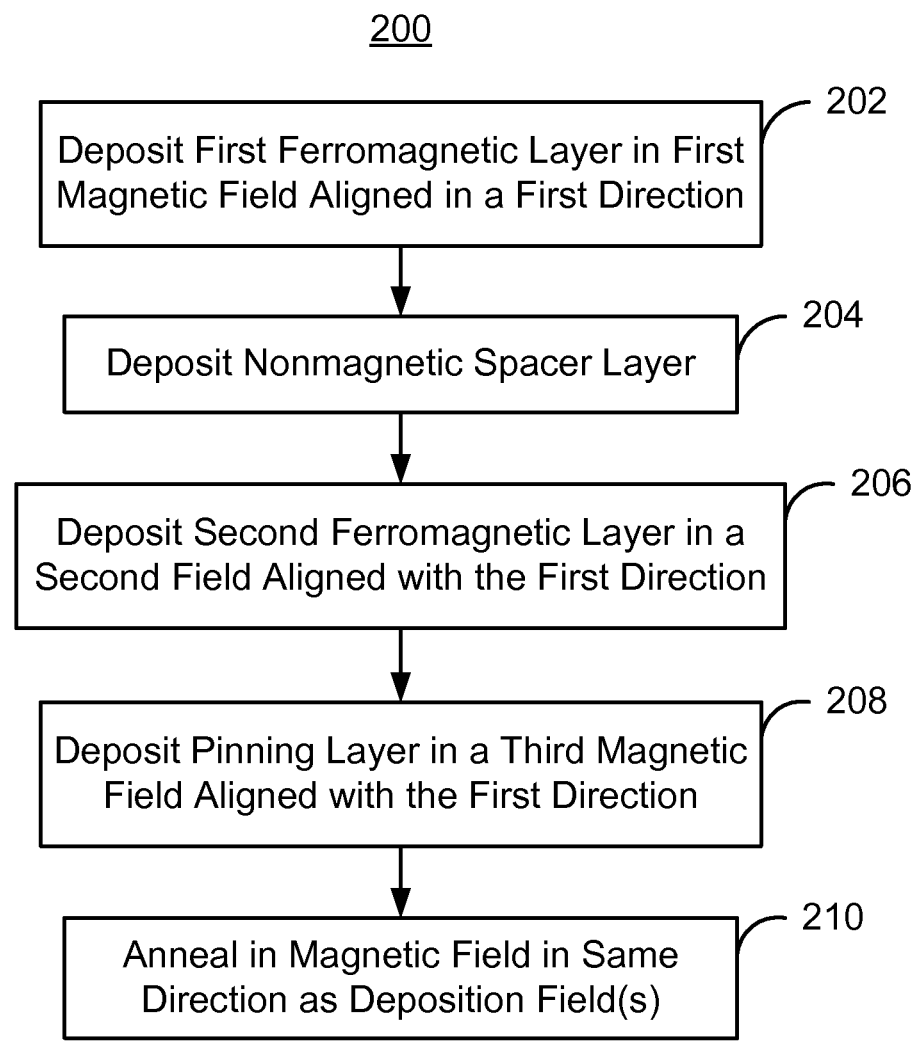
FIG. 7 is flow chart depicting an exemplary embodiment of a method for fabricating a shield in a magnetic recording read transducer.

FIG. 7 is an exemplary embodiment of a method 200 for providing a shield having antiferromagnetically coupled layers, such as the shield(s) 60 and/or 150. For simplicity, some steps may be omitted, interleaved, and/or combined. The method 200 is also described in the context of providing a single shield 60/150 in a magnetic recording transducer 50 depicted in FIGS. 2 and 6. However, the method 200 may be used to fabricate multiple shields in multiple at substantially the same time. The method 200 may also be used to fabricate other shields. The method 200 is also described in the context of particular layers. A particular layer may include multiple materials and/or multiple sub-layers. The method 200 also may start after formation of other portions of the magnetic recording transducer.

Referring to FIGS. 2 and 4-7, the first ferromagnetic layer 62/160 is deposited in a magnetic field aligned in a particular direction 124, via step 202. This field is in a direction 124 at a nonzero, nonorthogonal angle, β, from the sensor pinning direction 122. Step 202 may include depositing multiple layers 162 and 164 in the magnetic field.

The nonmagnetic spacer layer 64/170 is deposited, via step 204. This step may or may not be performed in the presence of a magnetic field. In some embodiments, step 204 includes depositing a Ru layer having a thickness of at least four and not more than ten Angstroms.

The ferromagnetic layer 66/180 is deposited in a magnetic aligned in a particular direction 124, via step 206. This field is in a direction 124 at a nonzero, nonorthogonal angle, β, from the sensor pinning direction 122. Thus, the magnetic fields used in steps 202 and 206 are aligned. In some embodiments, the same magnetic field is used in steps 202 and 206. Step 202 may include depositing multiple layers 182, 184 and 186 in the magnetic field.

The pinning layer 68/190 is deposited in a magnetic aligned in a particular direction 124, via step 208. This field is in a direction 124 at a nonzero, nonorthogonal angle, β, from the sensor pinning direction 122. Thus, the magnetic fields used in steps 202, 206 and 208 are aligned. In some embodiments, the same magnetic field is used in steps 202, 206 and 208.

The shield 60/150 is annealed in a field, via step 210. This annealing field is in a direction 124 at a nonzero, nonorthogonal angle, β, from the sensor pinning direction 122. Thus, the magnetic fields used in steps 202, 206, 208 and 210 are aligned. Note, however, that the magnitude of the magnetic field used in step 210 is generally greater than the magnitude of the field(s) used in steps 202, 206 and 208.

A more stable shield 60 and/or 150 may be provided using the method 200. Thus, the benefits of the shield 60 and/or 150 may be achieved.

I claim:

1. A method for providing a magnetic read transducer having an air-bearing surface (ABS) comprising:
    providing a first shield;
    providing a read sensor, the read sensor having at least one pinned layer aligned with a sensor pinning direction; and
    providing a second shield, the read sensor residing between the first shield and the second shield, the at least one pinned layer being closer to the first shield than to the second shield, the step of providing the second shield further including
        depositing a first ferromagnetic layer, a second ferromagnetic layer and a pinning layer, at least one of the first ferromagnetic layer, the second ferromagnetic layer and the pinning layer being deposited in the presence of a first magnetic field in a first direction non-orthogonal and non-parallel to the sensor pinning direction, a nonmagnetic spacer layer residing between the first ferromagnetic layer and the second ferromagnetic layer, the pinning layer being adjacent to the second ferromagnetic layer, the first ferromagnetic layer residing between the read sensor and the nonmagnetic spacer layer, the first ferromagnetic layer being coupled antiparallel with the second ferromagnetic layer.

2. The method of claim 1 wherein the step of providing the second shield further includes:
    annealing the second shield in a second magnetic field, the second magnetic field being aligned with the first direction.

3. The method of claim 1 wherein the first direction is at least forty-five degrees and not more than seventy degrees from the sensor pinning direction.

4. The method of claim 3 wherein the first direction is at least fifty degrees and not more than sixty degrees from the sensor pinning direction.

5. The method of claim 1 further comprising:
    providing a hard bias structure adjacent to the sensor, the hard bias structure having a magnetic moment aligned in a hard bias direction, the hard bias direction being substantially perpendicular to the sensor pinning direction.

6. The method of claim 1 further comprising:
    providing a soft bias structure adjacent to the sensor, the soft bias structure having a magnetic moment that is magnetically coupled with the second shield.

7. The method of claim 1 wherein the nonmagnetic spacer layer includes Ru.

8. The method of claim 7 wherein the nonmagnetic spacer layer has a thickness of at least four Angstroms and not more than ten Angstroms.

9. The method of claim 7 wherein the first ferromagnetic layer and the second ferromagnetic layer each include NiFe.

10. The method of claim 1 wherein the first ferromagnetic layer includes a NiFe layer and a CoFe layer, the CoFe layer residing between the NiFe layer and the nonmagnetic spacer layer.

11. The method of claim 1 wherein the second ferromagnetic layer includes a NiFe layer and a CoFe layer, the CoFe layer residing between the NiFe layer and the nonmagnetic layer.

12. The method of claim 11 wherein the second ferromagnetic layer includes an additional CoFe layer, the NiFe layer being between the CoFe layer and the additional CoFe layer.

13. The method of claim 1 wherein the first ferromagnetic layer, the second ferromagnetic layer and the pinning layer are deposited in the presence of the magnetic field.

14. The method of claim 1 wherein the pinning layer includes an antiferromagnetic layer.

15. The method of claim 1 wherein the step of providing the second shield further includes:
    providing the second shield such that the magnetic read transducer is free of ferromagnetic materials between the free layer and the second shield.

16. A method for providing a magnetic read transducer having an air-bearing surface (ABS) comprising:
    providing a first shield;

providing a read sensor, the read sensor having at least one pinned layer aligned with a sensor pinning direction;

providing a soft bias structure adjacent to the sensor, the soft bias structure having a magnetic moment; and providing a second shield, the read sensor residing between the first shield and the second shield, the at least one pinned layer being closer to the first shield than to the second shield, the step of providing the second shield further including depositing a first ferromagnetic layer, a second ferromagnetic layer and a pinning layer in the presence of a first magnetic field in a first direction, the first direction being at least fifty-five and not more than sixty degrees from the sensor pinning direction;

depositing a nonmagnetic spacer layer between the first ferromagnetic layer and the second ferromagnetic layer, the pinning layer being adjacent to the second ferromagnetic layer, the first ferromagnetic layer residing between the read sensor and the nonmagnetic spacer layer, the first ferromagnetic layer being coupled antiparallel with the second ferromagnetic layer, the nonmagnetic spacer layer including a Ru layer having a thickness of at least four and not more than ten Angstroms; and annealing the second shield in a second magnetic field, the second magnetic field being aligned with the first direction.

17. The method of claim 16 wherein the first ferromagnetic layer includes a NiFe layer and a CoFe layer, the CoFe layer residing between the NiFe layer and the nonmagnetic spacer layer.

18. The method of claim 16 wherein the second ferromagnetic layer includes a NiFe layer and a CoFe layer, the CoFe layer residing between the NiFe layer and the nonmagnetic spacer layer.

19. The method of claim 16 wherein the nonmagnetic spacer layer is Ru.

20. A method for providing a magnetic read transducer having an air-bearing surface (ABS) comprising:

providing a first shield;

providing a read sensor, the read sensor having at least one pinned layer aligned with a sensor pinning direction;

providing a magnetic bias structure adjacent to the sensor; and providing a second shield, the read sensor residing between the first shield and the second shield, the at least one pinned layer being closer to the first shield than to the second shield, the step of providing the second shield further including depositing a first ferromagnetic layer in the presence of a first magnetic field in a first direction non-orthogonal and non-parallel to the sensor pinning direction;

depositing a nonmagnetic spacer layer;

depositing a second ferromagnetic in the presence of a second magnetic field in the first direction, the nonmagnetic spacer layer being between the first ferromagnetic layer and the second ferromagnetic layer, the first ferromagnetic layer being coupled antiparallel with the second ferromagnetic layer; and depositing a pinning layer in the presence of a third magnetic field in the first direction; and annealing the second shield in a fourth magnetic field, the fourth magnetic field being aligned with the first direction.

21. The method of claim 20 wherein the first direction is at least fifty-five and not more than sixty degrees from the sensor pinning direction.

* * * * *